United States Patent [19]

Crankshaw

[11] 3,817,056
[45] June 18, 1974

[54] SOUND ISOLATION COUPLING
[75] Inventor: John H. Crankshaw, Erie, Pa.
[73] Assignee: Dynetics, Inc., Erie, Pa.
[22] Filed: June 13, 1972
[21] Appl. No.: 262,306

[52] U.S. Cl. ................. 64/14, 64/27 NM, 64/11 R
[51] Int. Cl. ............................................. F16d 3/64
[58] Field of Search ....... 64/14, 27 S, 27 NM, 27 R, 64/27 B, 11 R

[56] References Cited
UNITED STATES PATENTS

| | | | |
|---|---|---|---|
| 2,126,705 | 8/1938 | Schmidt | 64/11 R |
| 2,659,219 | 10/1953 | Mosso et al. | 64/14 |
| 2,849,871 | 9/1958 | Moeller | 65/27 R |
| 3,080,732 | 3/1963 | Crankshaw | 64/9 R |
| 3,427,827 | 2/1969 | Airheart | 64/14 |

*Primary Examiner*—Charles J. Myhre
*Assistant Examiner*—Randall Heald
*Attorney, Agent, or Firm*—Charles L. Lovercheck

[57] ABSTRACT

The specification discloses a rotating shaft coupling for connecting two shafts to transmit torque. The coupling is especially suited for high speeds for use by itself as a coupling between two shafts or in conjunction with another coupling such as a gear type coupling. Elastomeric material is molded in a form to provide maximum radial stiffness to achieve maximum load carrying capacity in a minimum diameter. The elastomeric material is contained radially to resist large radial loads and to maintain dynamic balance in spite of high centrifugal forces associated with high speed operation.

4 Claims, 5 Drawing Figures

3,817,056

SOUND ISOLATION COUPLING

STATEMENT OF INVENTION

This invention relates to couplings and, more particularly, to sound isolation couplings which will resist high torsional loads and maintain dynamic balane during high speed operation.

OBJECTS OF THE INVENTION

It is an object of the invention to provide an improved coupling.

Another object of the invention is to provide a sound isolation coupling which will resist high torsional load and maintain dynamic balance during high speed operation.

Another object of the invention is to provide a coupling that is simple in construction, economical to manufacture, and simple and efficient to use.

Another object of the invention is to provide a coupling wherein elastomeric material is contained radially to resist large radial loads and to maintain dynamic balance in spite of the high centrifugal forces associated with high speed operation.

With the above and other objects in view, the present invention consists of the combination and arrangement of parts hereinafter more fully described, illustrated in the accompanying drawings and more particularly pointed out in the appended claims, it being understood that changes may be made in the form, size, proportions, and minor details of construction without departing from the spirit or sacrificing any of the advantages of the invention.

REFERENCE TO PRIOR ART

This invention comprises an improvement on U.S. Pat. No. 3,080,732 issued to John H. Crankshaw on Mar. 12, 1963.

GENERAL DESCRIPTION OF THE DRAWINGS

DETAILED DESCRIPTION OF THE DRAWINGS

Figure 1:
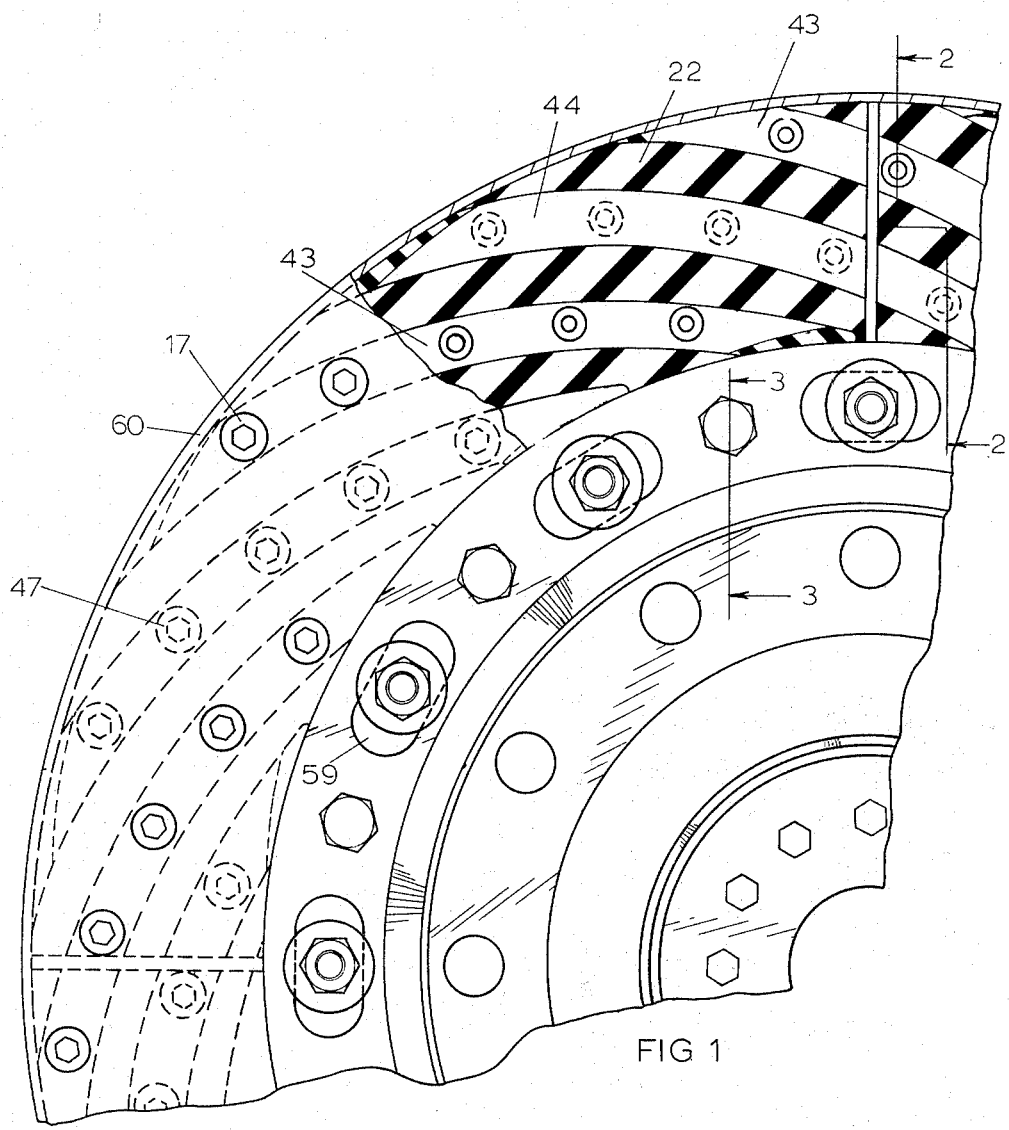
FIG. 1 is an end view partially in cross section showing the coupling according to the invention.

The coupling shown is made up of aft flange 15 and isolation back plate 18 axially spaced from each other. Inner sleeve 11 is rigidly fixed to the back plate 18 by means of the drive pins 13 having backing nuts 14 thereon and having a flange 42, which engages a counterbore in the inner sleeve 11. The internal teeth 40 are fixed to the inner sleeve 11.

A plurality of rigid first fingers 43 are fixed to the aft flange 15 by means of studs 17 that are received in sleeve 16. Fingers 44 and 43 are arcuate members which may be cut from a section of a large tube. Fingers 44 are fixed to the isolation back plate 18 by means of studs 47 received in sleeve 46. The outer ends of fingers 43 engage outer drum 60 and the inner ends of fingers 43 terminate short of and/or spaced from the inner sleeve 11. The inner ends of the fingers 44 engage the inner sleeve 11 and the outer ends of fingers 44 are spaced from outer drum 60.

The space between the fingers 43 and 44 are filled with elastomeric material 22 which is bonded to the inside of the drum 60 and to the outside of the sleeve 11 as well as to the fingers 43 and 44. Therefore, there is a maximum radial stiffness and the outer ring maintains dynamic balance even at very high rotational speeds. Drum 60 may be considered to be an outer cylindrical member, sleeve 11 an inner cylindrical member, aft flange 15 and back plates 18 annular members, closing the space between the ends of members 11 and 60.

The isolation coupling is shown in combination with a gear coupling. A sleeve 52 has a hub 6 fixed to one end and a hub 56 fixed to the other end. These hubs are held in place by rings 3 that are bolted to the end of the sleeve 52 by means of bolts 5 and lock washers 4. The hub 6 has teeth 33 that engage the internal teeth 40, and the hub 56 has teeth 57 which engage internal teeth 58. The movement of the hubs relative to the internal teeth is limited by the rings 8, which are held in place by means of studs 10 and lock washers 9.

In use the coupling may have its sleeve 61 fixed to one torsional member, for example, a drive, and sleeve 7 fixed to a driven member. It will be noted that the torque will be transmitted from flange 15 to the outer drum 60 through fingers 43 to the elastomeric material to fingers 44 to the isolation back plate 18 to internal teeth 40. Thence, the torque will be transmitted through the hub 6, coupling sleeve 52, to the hub 56, and thence to the sleeve 7.

It will be noted that the fingers 43 and 44 lie along tangents to the inner sleeve 11 and are curved in a radius approximately equal to the radius of the inner sleeve 11. The exact position of the fingers and the shape of the fingers themselves may vary. It will also be noted that the inner ends of the fingers 44 rest on the inner sleeve 11, and the outer ends of the fingers 43 rest on the outer sleeve 60, so that a torsional force between the couplings is transmitted from the fingers 43 through the elastomeric material to the fingers 44. The elastomeric material is confined in enclosures bounded by fingers 43 and 44, inner sleeves 11, and outer sleeves 60. It will be noted that there is a clearance at slots 59 between the pins 13 and the back plate 18. Also, there is a clearance at 51 between the back plate 18 and the outer sleeve 60.

Figure 4:
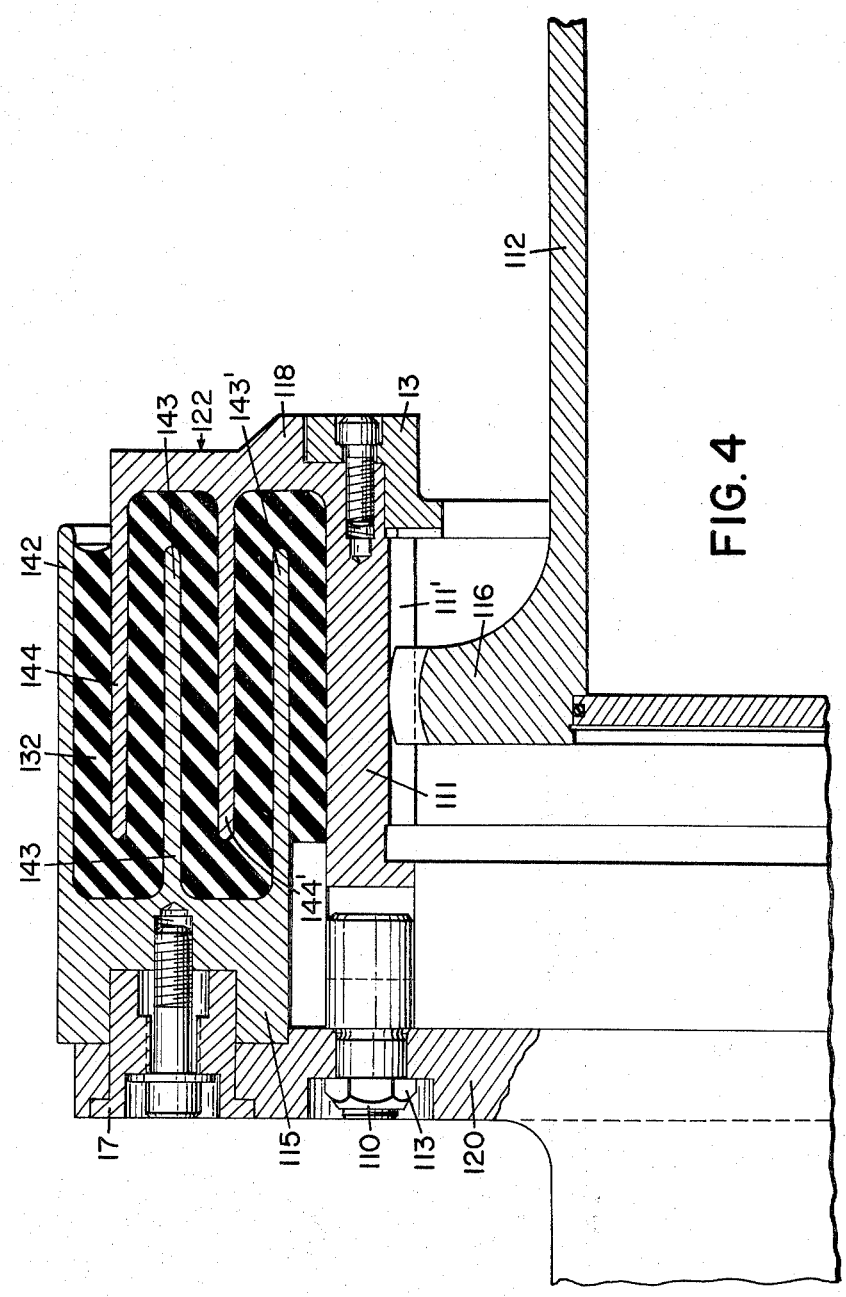
FIG. 4 is a view of another embodiment of the invention.

In the embodiment of the invention shown in FIG. 4, the coupling shown is made up of isolation assembly which includes an aft flange 115 and an isolation back plate 118 spaced axially from each other. The inner sleeve 111 and the concentric flanges 144 and 144' are all integrally fixed to the back plate 118.

The flanges 142, 143 and 143' are all concentric to each other and integrally attached to the aft flange 115. The flanges 144 and 144' and inner sleeve 111 are all concentric to each other and define spaces therebetween. The spaces between flanges 142, 143, 143', 144 and 144' and inner sleeve 111 are filled with the elastomeric material 132. The elastomeric material 132 is bonded to flanges 142, 143, 143', 144 and 144' and inner sleeve 111, as well as to the aft flange 115 and the back plate 118.

The isolation assembly is fixed to flange 120 which may in turn be fixed to a driven member while the internal teeth 111' are integral with the inner sleeve 111. The hub teeth 116 engage internal teeth 111' and the hub teeth 116 are supported on the hub 112. The pins 110 are fixed to the flange 120 and held rigidly thereto by nuts 113. The pins 110 extend in cantilever fashion toward the hub teeth 116 and are disposed in large openings 125 in the inner sleeve 111.

Figure 3:
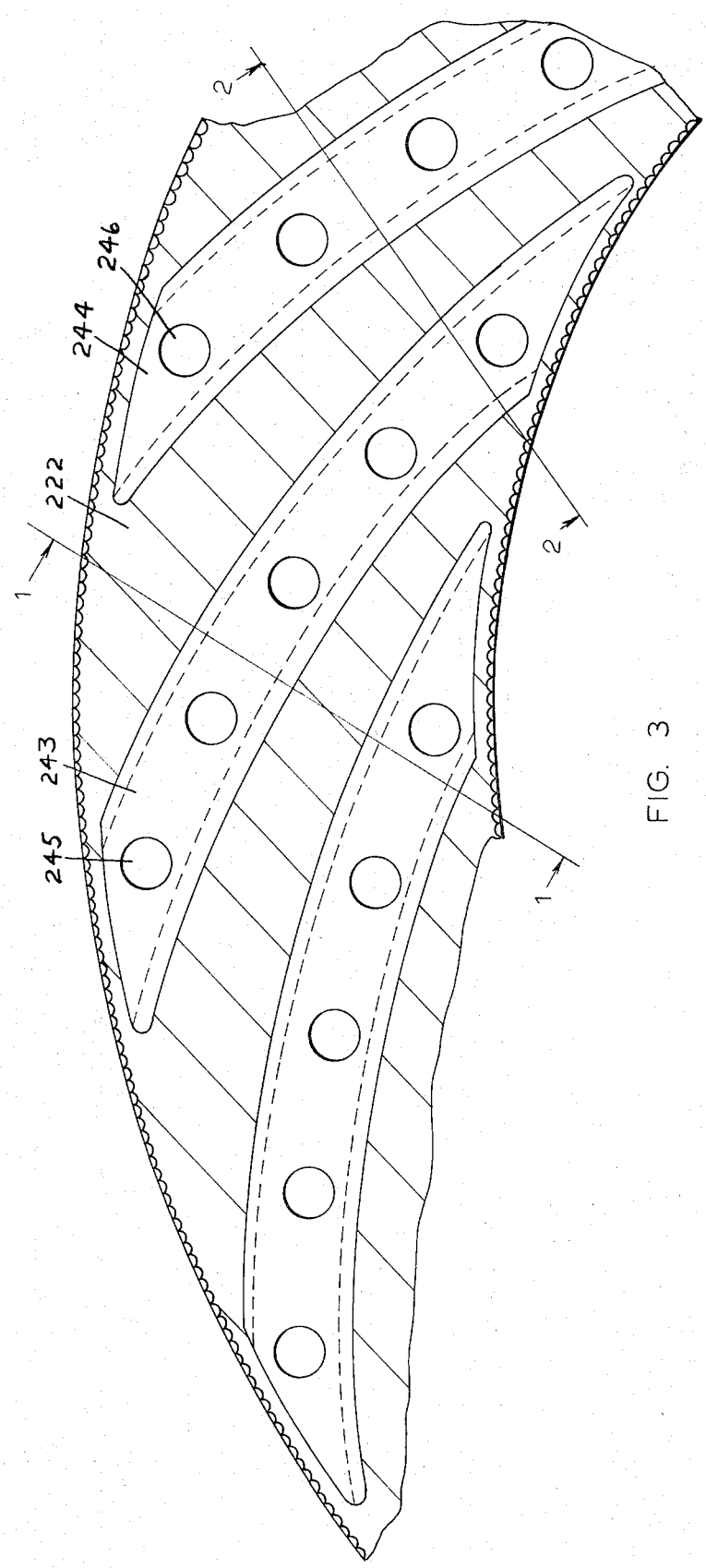
FIG. 3 is a partial end view similar to FIG. 1.
Figure 5:
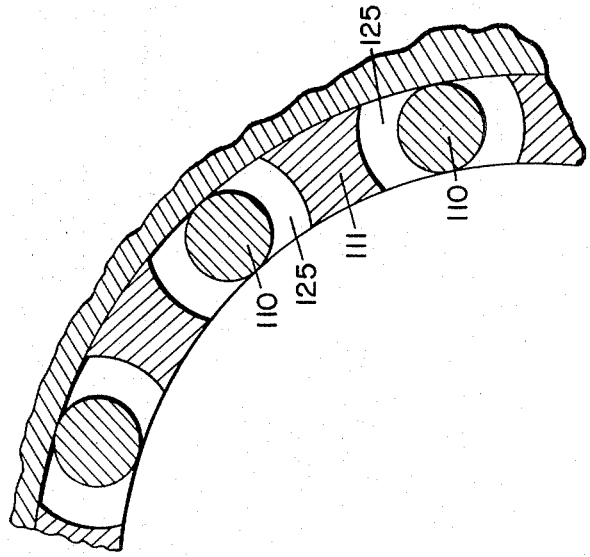
FIG. 5 is a cross sectional view of an isolation segment of another embodiment of a coupling.

In the embodiment of the invention shown in FIG. 3, I show an isolation element which may be used in a coupling such as shown in the other embodiments of the invention.

The annular cylindrical member 222 is molded from rubber, Neoprene or other suitable resilient material. Rigid elements 243 and 244 are made of rigid material such as metal. Rigid elements 243 and 244 have holes 245 and 246 respectively therethrough through which bolts may extend for attaching the rigid elements to annular drive elements like annular members 15 and 11 in FIG. 2.

Figure 2:
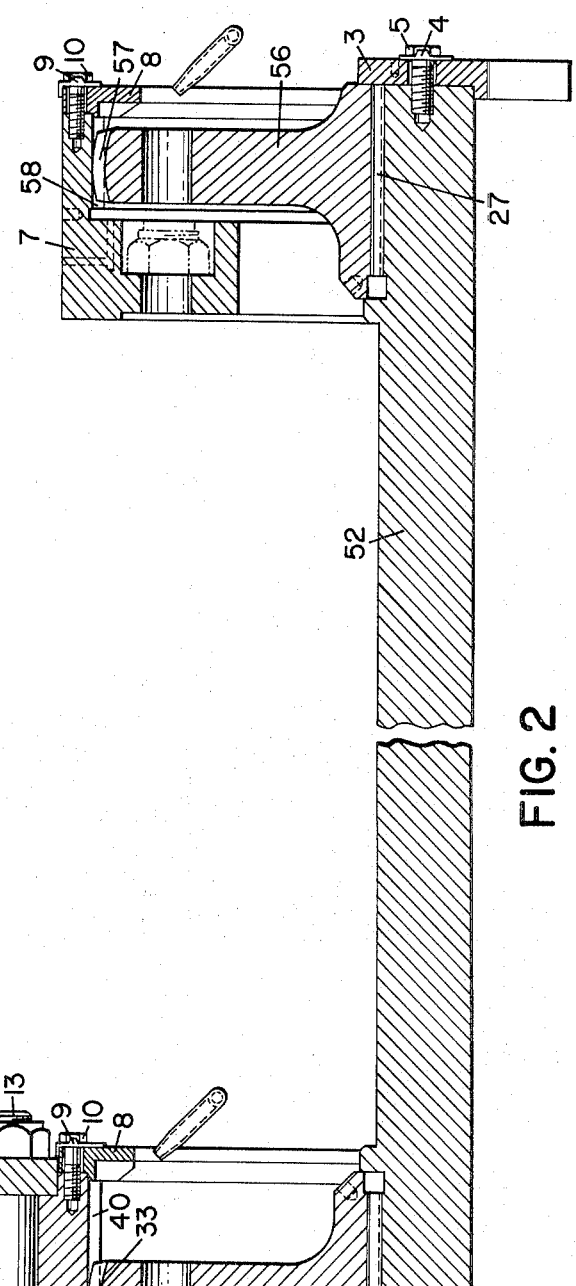
FIG. 2 is a cross sectional view taken on line 2—2 of FIG. 1.

The rigid members 243 and 244 may project laterally from opposite sides of the resilient material in the manner that the rigid members 43 and 44 project laterally in the embodiment of FIG. 2.

The resilient material 22 in FIG. 2 may be encased in an outer cylindrical member and an inner cylindrical member to prevent distortion due to centrifugal force.

The foregoing specification sets forth the invention in its preferred practical forms but the structure shown is capable of modification within a range of equivalents without departing from the invention which is to be understood is broadly novel as is commensurate with the appended claims.

The embodiments of the invention in which an exclusive property or privilege is claimed are defined as follows:

1. An isolation coupling comprising
    an inner cylindrical member and an outer cylindrical member concentrically disposed relative to each other,
    annular means connected to said inner cylindrical member closing the annular space between one end of said outer cylindrical member and said inner cylindrical member,
    and means attached to said outer cylindrical member closing the annular space between said first end of said outer cylindrical member and the first end of said inner cylindrical member,
    and means attached to said inner cylindrical member closing the annular space between said second end of said outer cylindrical member and the second end of said inner cylindrical member,
    and first spaced rigid members fixed to said inner cylindrical member and extending between said outer cylindrical member and said inner cylindrical member and tilted to a radius of said annular member,
    and second spaced rigid members fixed to said inner cylindrical member and disposed between said first spaced members and tilted to the radius of said annular member,
    and elastomeric material disposed between said inner cylindrical member and said outer cylindrical member and between said first rigid members and said second rigid members, completely filling the space therebetween,
    said elastomeric material being bonded to said rigid members,
    said elastomeric material being confined between said inner cylindrical member and said outer cylindrical member against radial deflection due to centrifugal force in the coupling,
    and means for connecting said isolation coupling between a dirve member and a driven member whereby torsional force is transmitted between said outer cylindrical member and said inner cylindrical member.

2. The coupling recited in claim 1 wherein said first rigid members comprise segments of generally cylindrical members having their first end connected to said first annular member,
    and said second rigid members comprise segments of second cylindrical members fixed to said second annular member and disposed between said first rigid members,
    said rigid members, said inner cylindrical member and siad outer cylindrical member all being disposed concentric to each other.

3. The coupling recited in claim 1 wherein said rigid members comprise first rigid members fixed to said inner cylindrical member and extending generally tangentially to said inner cylindrical member,
    and second rigid members fixed to said outer cylindrical member and extending inwardly therefrom and spaced from said first rigid members and terminating in spaced relation to said inner cylindrical member,
    said first rigid members being fixed to said first annular members and spaced from said second annular members,
    and said second rigid members being fixed to said second annular members and spaced from said first annular members.

4. The coupling recited in claim 3 wherein said first rigid members and said second rigid members are curved in their longitudinal dimension and the radii of curvature of said rigid members being substantially equal to the radii of curvature of said outer cylindrical members.

* * * * *